(12) United States Patent
Hartkopf

(10) Patent No.: US 11,247,509 B2
(45) Date of Patent: Feb. 15, 2022

(54) CASTER COMPRISING A RUNNING WHEEL

(71) Applicant: TENTE GmbH & Co. KG, Wermelskirchen (DE)

(72) Inventor: Horst Hartkopf, Leverkusen (DE)

(73) Assignee: TENTE GmbH & Co. KG, Wermelskirchen (DE)

( * ) Notice: Subject to any disclaimer, the term of this patent is extended or adjusted under 35 U.S.C. 154(b) by 651 days.

(21) Appl. No.: 16/315,326

(22) PCT Filed: Jul. 6, 2017

(86) PCT No.: PCT/EP2017/066861
§ 371 (c)(1),
(2) Date: Jan. 4, 2019

(87) PCT Pub. No.: WO2018/011043
PCT Pub. Date: Jan. 18, 2018

(65) Prior Publication Data
US 2021/0276366 A1    Sep. 9, 2021

(30) Foreign Application Priority Data
Jul. 15, 2016 (DE) ............... 10 2016 113 069.9

(51) Int. Cl.
*B60B 33/02* (2006.01)
*B60B 33/00* (2006.01)

(52) U.S. Cl.
CPC ........ *B60B 33/021* (2013.01); *B60B 33/0049* (2013.01); *B60B 33/0068* (2013.01);
(Continued)

(58) Field of Classification Search
CPC . B60B 33/0078; B60B 33/0086; B60B 33/02; B60B 33/025; B60B 33/021; B60B 33/0081
See application file for complete search history.

(56) References Cited

U.S. PATENT DOCUMENTS 4,414,702 A * 11/1983 Neumann ............. B62B 5/0485
16/35 R
4,658,466 A * 4/1987 Vollberg ............. B60B 33/0078
16/19
(Continued)

FOREIGN PATENT DOCUMENTS

DE    10 2004 035 220 A1    2/2006
DE    20 2010 015 321 U1    6/2011
DE    20 2012 100 345 U1    3/2012

OTHER PUBLICATIONS

International Search Report of PCT/EP2017/066861, dated Nov. 13, 2017.

*Primary Examiner* — Jeffrey O'Brien
(74) *Attorney, Agent, or Firm* — Collard & Roe, P.C.

(57) ABSTRACT

A caster includes a running wheel, a fork and an assembly journal, wherein the fork is pivotable in relation to the assembly journal and a braking device is arranged in the fork and can be displaced into the braking position via a tappet actuated by a trip cam. A direction lock can be set without a braking action on the running wheel. Two tappets are movable independently of each other, wherein only the direction lock without a braking action can be set via one of the tappets. Another caster includes a running wheel, a fork and an assembly journal, wherein a braking device is provided in the fork and can be displaced into the braking position via a trip cam. The braking device has a first braking part for friction-locking action on the running wheel and a second braking part for the interlocking lock of the running wheel.

14 Claims, 13 Drawing Sheets

(52) U.S. Cl.
CPC ...... *B60B 33/0081* (2013.01); *B60B 33/0086* (2013.01); *B60B 33/025* (2013.01); *B60B 33/0057* (2013.01); *B60B 2200/242* (2013.01)

(56) References Cited

U.S. PATENT DOCUMENTS

| | | | | |
|---|---|---|---|---|
| 4,677,706 A * | 7/1987 | Screen | ................ | B60B 33/0042 16/35 R |
| 4,815,161 A * | 3/1989 | Timmer | ................ | B60B 33/021 16/35 R |
| 5,014,391 A * | 5/1991 | Schulte | ............... | B60B 33/0042 16/35 R |
| 5,139,116 A * | 8/1992 | Screen | ................ | B60B 33/0042 16/35 R |
| 5,184,373 A * | 2/1993 | Lange | ..................... | B60B 33/00 16/35 R |
| 5,303,450 A * | 4/1994 | Lange | ................ | B60B 33/021 16/35 D |
| 5,503,416 A * | 4/1996 | Aoki | .................... | A61B 6/4405 16/35 R |
| 5,774,936 A * | 7/1998 | Vetter | ................... | B60B 33/021 16/35 R |
| 6,834,746 B1 * | 12/2004 | Lin | ..................... | B60B 33/0018 16/35 R |
| 7,134,167 B2 * | 11/2006 | Yan | ..................... | B60B 33/0021 16/39 |
| 7,406,745 B2 * | 8/2008 | Chou | ................. | B60B 33/0021 16/35 R |
| 7,506,404 B2 * | 3/2009 | Block | ................. | B60B 33/0021 16/18 R |
| 7,810,613 B2 * | 10/2010 | Lin | ...................... | B60B 33/025 188/1.12 |
| 7,987,553 B2 * | 8/2011 | Lin | ..................... | B60B 33/0049 16/35 R |
| 7,992,254 B2 * | 8/2011 | Ahn | .................... | B60B 33/0068 16/35 R |
| 8,079,606 B2 * | 12/2011 | Dull | .................... | B60B 33/0021 280/47.39 |
| 8,365,354 B1 * | 2/2013 | Fan | ........................ | B60B 33/04 16/35 R |
| 8,452,508 B2 * | 5/2013 | Frolik | ................ | B60B 33/0039 701/70 |
| 8,516,656 B2 * | 8/2013 | Lin | ..................... | B60B 33/0081 16/35 R |
| 8,789,662 B2 * | 7/2014 | Childs | ................. | A61G 1/0243 188/1.12 |
| 8,850,657 B1 * | 10/2014 | Yang | .................... | B60B 33/021 16/35 R |
| 9,038,786 B2 * | 5/2015 | Lin | ..................... | B60B 33/0042 188/1.12 |
| 9,139,043 B1 * | 9/2015 | Fan | ..................... | B60B 33/0047 |
| 9,168,785 B2 * | 10/2015 | Spektor | ............... | B60B 33/0049 |
| 9,908,367 B2 * | 3/2018 | Yamamoto | .......... | B60B 33/0086 |
| 10,486,466 B1 * | 11/2019 | Yang | .................... | B60B 33/0057 |
| 10,857,833 B2 * | 12/2020 | Patmore | ............. | B60B 33/0039 |
| 11,065,913 B2 * | 7/2021 | Molozis | ................ | B60B 33/025 |
| 2006/0254867 A1 * | 11/2006 | Yan | ..................... | B60B 33/0086 188/73.1 |
| 2011/0067202 A1 * | 3/2011 | Chou | ................. | B60B 33/0068 16/45 |
| 2012/0255141 A1 * | 10/2012 | Lin | ..................... | B60B 33/0081 16/45 |
| 2015/0210114 A1 * | 7/2015 | Spektor | .................... | B62B 3/00 16/35 R |
| 2015/0258850 A1 * | 9/2015 | Schioppa | ............ | B60B 33/0042 16/35 R |

* cited by examiner

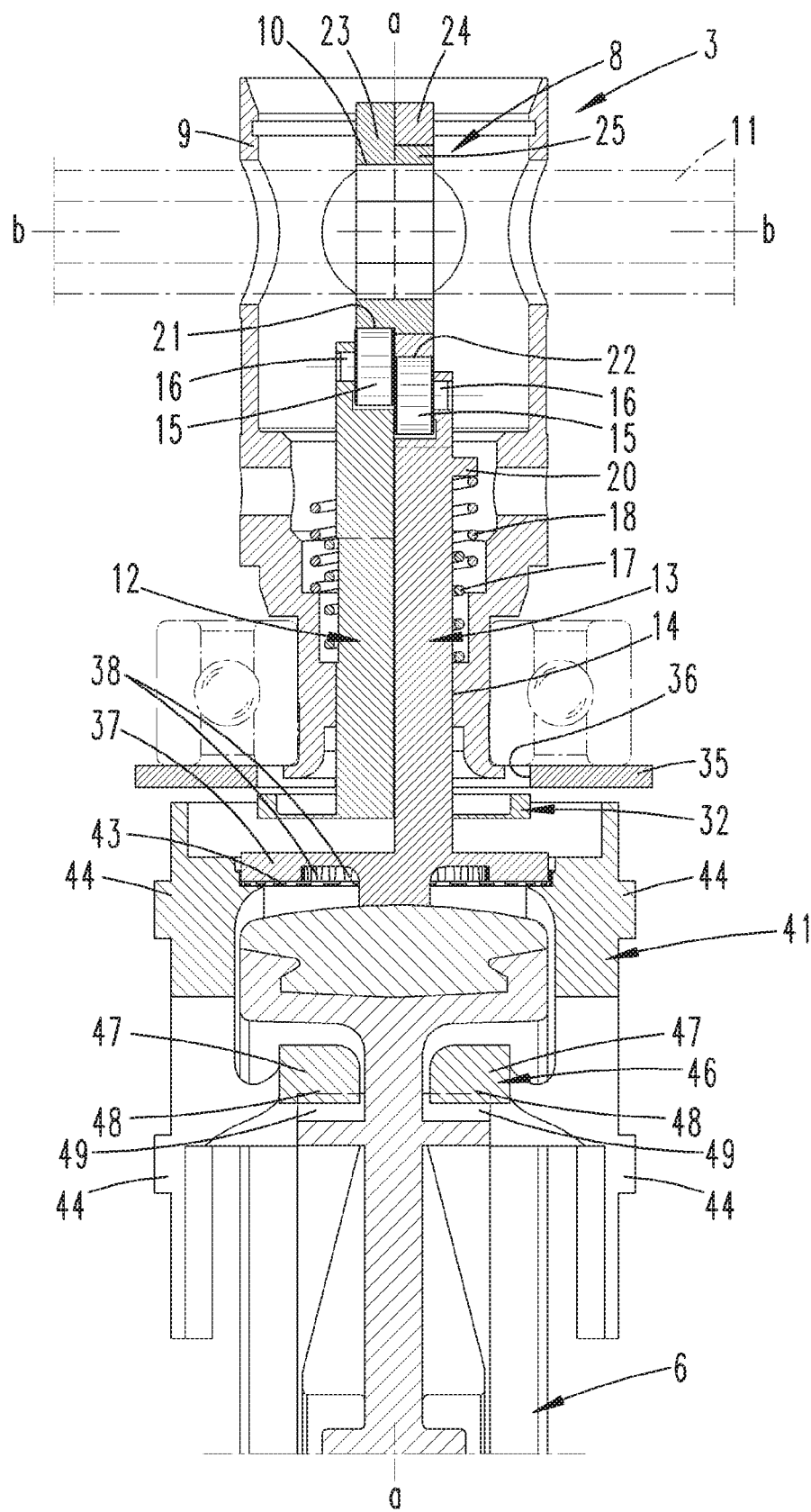

CASTER COMPRISING A RUNNING WHEEL

TECHNICAL FIELD

The invention initially relates to a caster comprising a running wheel, a fork, and an assembly journal, wherein the fork is pivotable in relation to the assembly journal, and a braking device is furthermore arranged in the fork which is displaceable into a braking position via a tappet actuated by a trip cam, wherein a direction lock may be set without a braking action on the running wheel, and two tappets are provided which are movable independently of each other, wherein only the direction lock without a braking action is able to be set via one of the tappets.

Furthermore, the invention relates to a caster comprising a running wheel, a fork, and an assembly journal, wherein a braking device is provided in the fork which is preferably displaceable into the braking position via a trip cam, wherein the braking device has a first braking part for friction-locking action on the running wheel.

PRIOR ART

Casters of the type in question are known. These are used, e.g. on hospital beds, transport devices, and the like. These casters normally have an assembly journal projecting vertically in the operating position, via which the caster is attachable to the hospital bed or the like.

In this context, the arrangement of a braking device in the caster is known, said braking device being displaceable in the direction of the running wheel of the caster via a switch lever arranged transversely or longitudinally in the assembly journal, e.g., via foot activation by an operator, in order to thus lock the running wheel. Casters are also known which have structural elements in the fork interior, by means of which the castor may also be a set as a fixed caster.

Furthermore, such a caster is known, e.g., from DE 10 2004 035 220 A1. This has a tappet which is used functionally both in the tappet downstroke position and also in the tappet upstroke position. In the tappet downstroke position, a complete locking is achieved in this known solution, thus a braking position combined with a pivot lock. The caster may be set as a pivot-limited fixed caster via the tappet upstroke position.

A braking part, which is displaceable into the braking position via the trip cam and acts in a friction locking way on the running wheel, in particular on the running wheel surface, is also known from the previously mentioned patent.

A caster comprising two tappets is known from US 2015/0210114 A1, wherein the tappet used for the direction lock extends horizontally in the normal operating position. While the first tappet is to be operated by a cotter key, the second tappet is actuatable counter to spring force via a foot lever.

A caster is known from DE 20 2010 015 321 U1 in which an interlocking brake lock is provided.

BRIEF SUMMARY OF THE INVENTION

Starting from the prior art presented, the object of the invention is to specify a caster comprising a tappet actuatable via a trip cam which is advantageously designed. In addition, it is the object to specify a caster which is advantageous with respect to the braking properties.

The first problem is solved in that the tappets are arranged next to one another transverse to a vertical direction in a normal operating position of the caster, and extend next to one another in the vertical direction, and that the trip cam has two cam surfaces which are each assigned to one tappet, and that the cam surfaces are designed differently from each other.

As a result of the proposed configuration, in comparison to known solutions comprising only one tappet, lower switching forces are required for achieving a braking action, as well as for achieving a direction lock without a braking action. To achieve the one or the other operating position, it is preferable to displace only one of the tappets comprising these action segments, while in a preferred configuration, the other tappet comprising the other action segment does not does not follow any displacement path, or at least no displacement path increasing the switching forces, over the course of this displacement.

Thus, as is also preferred, only the single tappet, which applies or supports the corresponding braking action to act upon the running wheel, may be displaced to achieve a braking action on the running wheel. Conversely, to achieve a direction lock, as is also preferred here, only the single tappet, which acts on the device parts or supports the corresponding lock segments, may be displaced.

The two tappets are actuated via a trip cam. The linear displacement of each tappet in a direction may, as is also preferred, be achieved counter to the force of a reset spring.

With respect to the additional problem, a solution is provided in that the braking device has a second braking part for the interlocking lock position of the running wheel for the combined interlocking frictional lock position of the running wheel. In a normal operating position of the caster, the tappets are arranged next to one another transverse to a vertical direction and extend next to one another in the vertical direction. The tappets may also extend in a known way inside of the fork, like the arrangement of only one tappet, preferably aligned along a vertical pivot axis of the caster in the operating state.

The tappets may also lie contacting one another in a plane transverse to the vertical direction on surfaces forming a line in the cross section. This contact line aligned transverse to the vertical direction may be intersected by a geometric pivot axis of the caster.

In one embodiment, the trip cam has two cam surfaces which are each assigned to one of the tappets. The cam surfaces are designed differently from each other so that a rotation of the trip cam leads to different displacement paths of the tappets across the different cam surfaces. The extent of the tappet displacement path across a circumferential region of the assigned cam surface may also equal zero.

The trip cam may, as is also preferred, be rotatable about a geometric axis aligned transverse to the vertical direction of the caster. The cam surfaces acting on the tappets have, with respect to an outline in which the axis of rotation defines a point, peripheral curve segment shaped control sections, with radii changing across the periphery.

The trip cam may act on one or both tappets by means of a roller bearing. The arrangement of a roller bearing may lead to further reduction of the switching forces.

In a preferred embodiment, one or both roller bearings is/are mounted on one or respectively one of the tappets. Thus, such a roller bearing may be rotatably arranged on each tappet, preferably mounted to be rotatable about an axis running parallel to the axis of rotation of the trip cam.

In another, also preferred embodiment, the trip cam may be designed as two parts, comprising one first and one second partial cam. Each partial cam is assigned to a tappet. The two partial cams have cam surfaces which are designed differently from one another.

The two partial cams may be designed as disks, additionally e.g., as annular disks.

The first partial cam may also penetrate the second partial cam in a direction transverse to the vertical direction. Thus, the second partial cam may be mounted on the first partial cam to be rotatable relative thereto. The penetration direction is preferably oriented to the extension direction of the trip cam axis of rotation.

The trip cam may be penetrated by a switching lever. Such a switching lever may be exposed for actuation by the user, wherein such an actuation via the switching lever may be, as is preferred, a rotational displacement of the trip cam.

In the known solutions, the switching lever is connected rotationally fixedly, with reference to the direction of rotation about the axis of rotation of the trip cam, to the trip cam, e.g., as a result of a corresponding interlocking interaction. In the embodiment of two partial cams, the switching lever in one possible embodiment acts directly on only one of the partial cams. The switching lever may act indirectly on the additional (second) partial cam, via the other (first) partial cam, to which the switching lever may be connected, for example, in an interlocking way.

In another embodiment, the first partial cam may be rotatable relative to the second partial cam about an axis of rotation, about which the trip cam is rotated during actuation. The rotation of the one partial cam relative to the other partial cam may, as is also preferred, be limited with respect to the rotational displacement path.

One of the tappets may also interact with a braking part, wherein the braking part preferably comprises a first friction-locking braking part and a second interlocking lock braking part. The braking part or the two individual braking parts may be fixed directly on the assigned tappet and thus are displaceable together with the same. In one alternative embodiment, the braking part or the individual braking parts may be provided separately and mounted in the fork, to be impinged by this tappet and if necessary to be towed by this tappet in the displacement direction of the tappet.

The friction-locking braking part and the interlocking lock braking part may also simultaneously be towed via the tappet and if necessary across the same displacement path. In this respect, it is also possible that, when impinged by the tappets, one of the braking parts travels along a larger displacement path into the braking position than the other braking part.

For the interlocking lock of the running wheel, this may have a sprocket which is designed preferably to interact with the second interlocking lock braking part. Such a sprocket extends preferably concentrically to the running wheel axis of rotation, may additionally be designed in the region of a running wheel rim. Preferably, two sprockets are provided on both sides of a running wheel hub.

The interlocking lock braking part has, in the case a sprocket is provided, a correspondingly adapted counter toothing. The interlocking lock braking position is achieved when the teeth of the interlocking lock braking part engage in the tooth gaps of the running-wheel-side sprocket and vice versa.

The interlocking lock means of the second braking part may also be fixed on a part, which is preferably fixedly connected to the first braking part yet also elastically movable with respect thereto. The interlocking lock means correspondingly preferably implement the same displacement path in the vertical direction as the friction locking means of the first braking part. The elastic connection to the first braking part offers the possibility of a (limited) relative movement of the one braking part to the other braking part, e.g., in the case that the running wheel adopts a position, viewed in the running direction, in which the teeth of the interlocking means strike the teeth of the running-wheel-side sprocket and thus a meshing of the teeth to form the interlocking lock position is prevented. The braking device may also be displaced as a unit into its braking end position in such a situation. The part supporting the interlocking means yields elastically.

In one such position, the running wheel may initially be braked solely by the friction-locking braking part. A minor displacement of the running wheel in the running direction—wherein in practice a slight shake is already sufficient—leads to an automatic displacement of the interlocking means into the interlocking lock position as a result of the spring-like acting reset force of the second braking part elastically movable with respect to the first braking part.

The second braking part may be designed on an arm projecting from the first braking part in the circumferential direction of the running wheel. Such an arm extends essentially preferably following the curved path of the assigned sprocket, hereby preferably along a freely projecting length, which corresponds to one-twentieth up to one-fifth, additionally approximately one-tenth of the circumferential length of the sprocket. The length of the sprocket in the circumferential direction is hereby defined by the length of a circular line, which connects the tooth crests of the sprocket in an outline of the sprocket, in which the axis of rotation of the running wheel defines a point.

BRIEF DESCRIPTION OF THE DRAWINGS

The invention is subsequently described in greater detail by way of the appended drawing, which depicts merely one exemplary embodiment. As shown in:

FIG. 13 the section according to line XIII-XIII in FIG. 12.

DETAILED DESCRIPTION OF THE INVENTION

Figure 1:
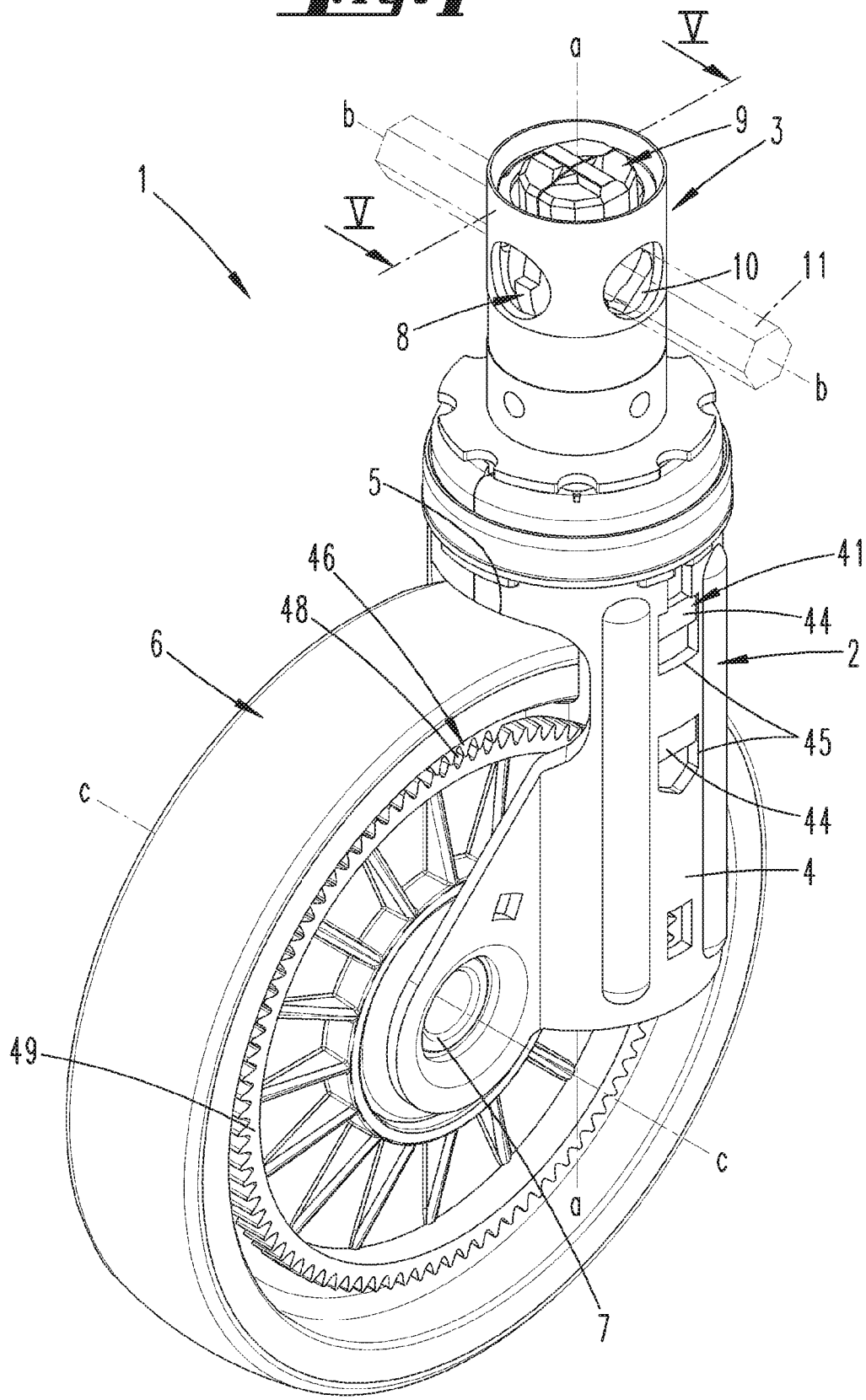
FIG. 1 a caster in a perspective view.
Figure 2:
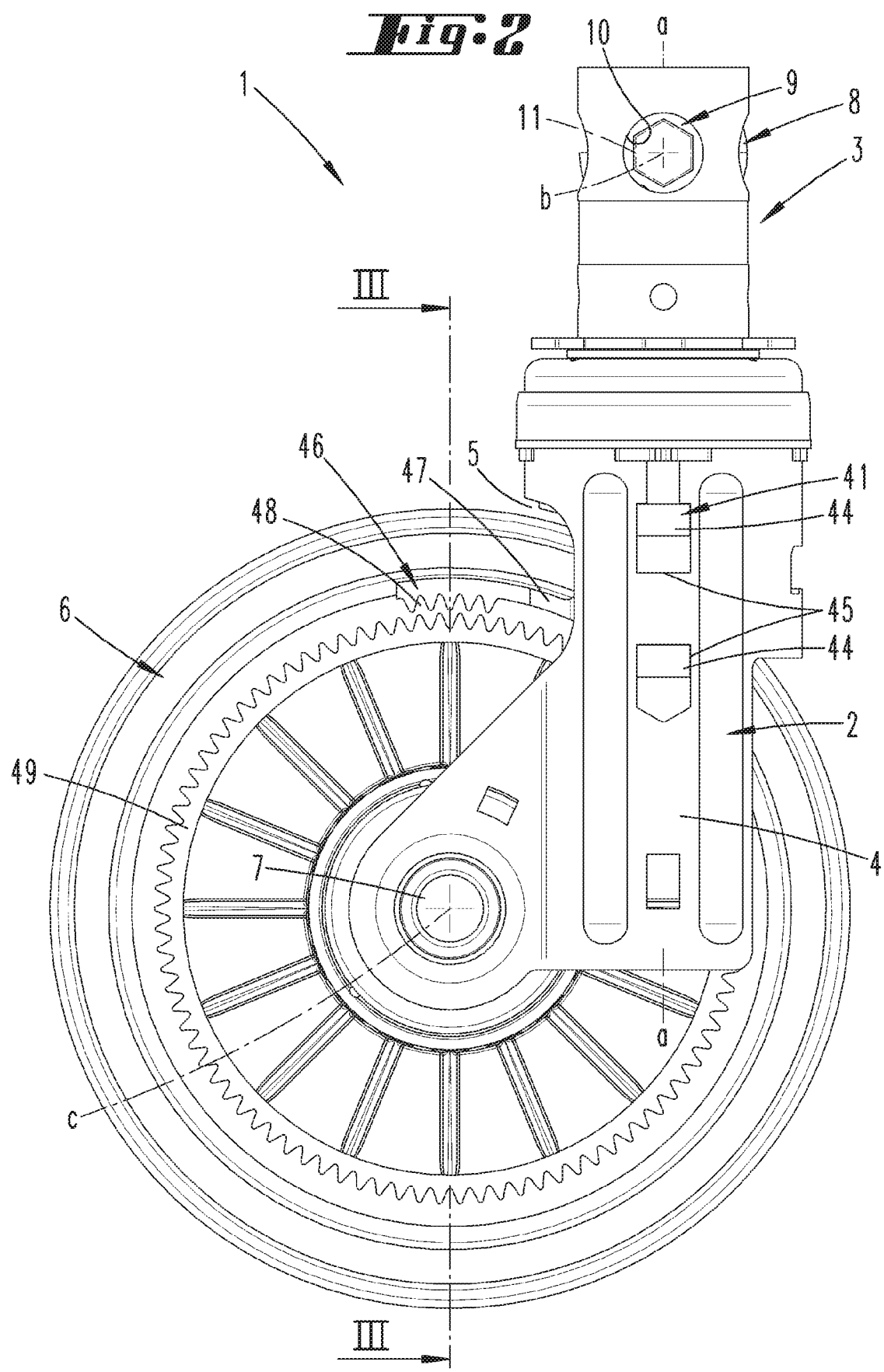
FIG. 2 the caster in a side view.
Figure 3:
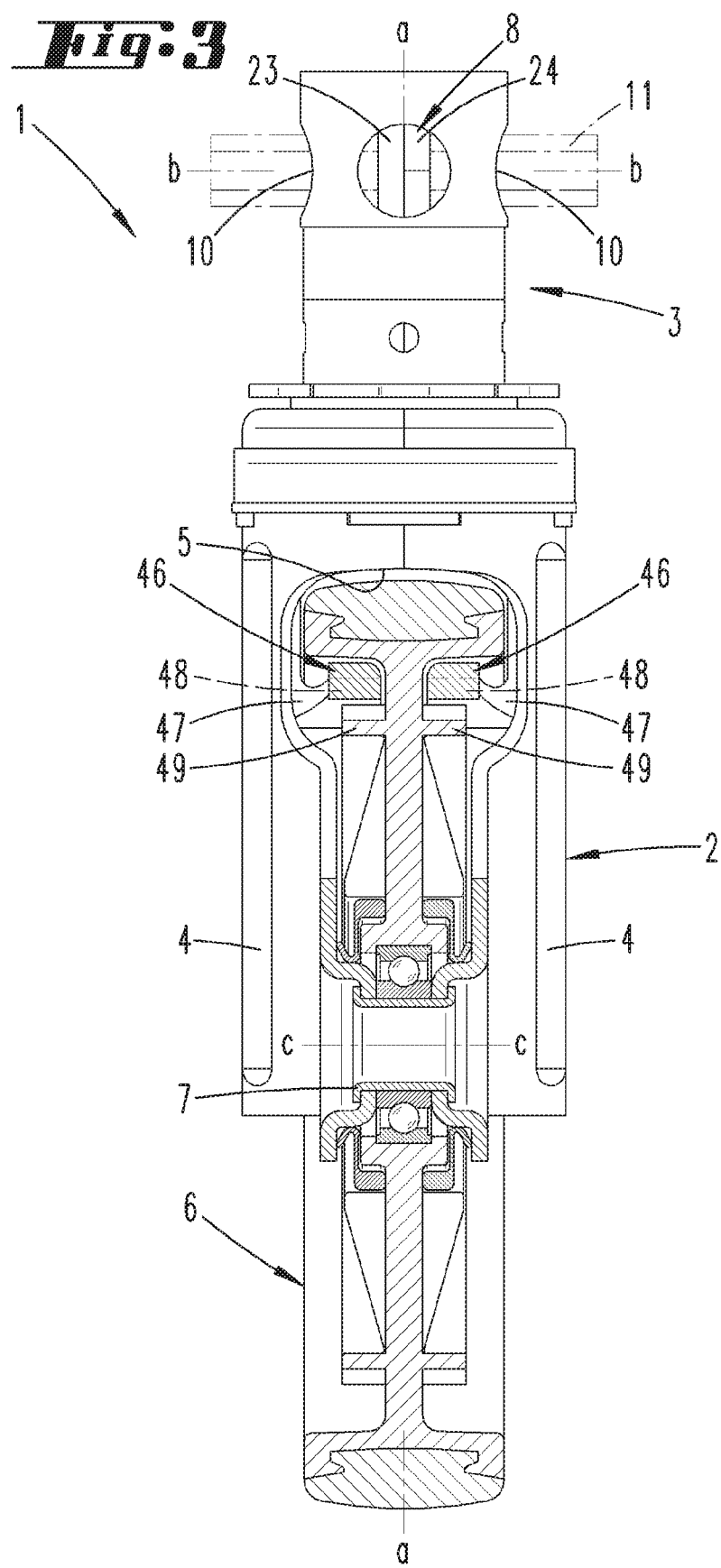
FIG. 3 the section according to line III-III in FIG. 2.
Figure 4:
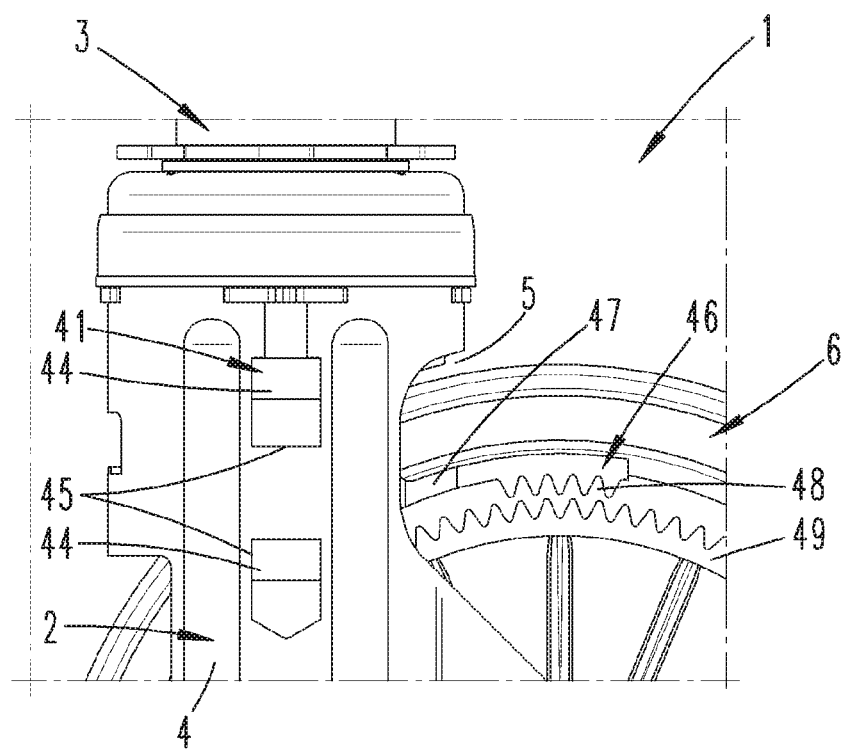
FIG. 4 a sectional view of a region relating to the interlocking lock of the running wheel.

A caster comprising a fork 2, from which a cylindrically configured assembly journal 3 projects vertically surrounding a pivot axis a, is shown and described initially with reference to FIG. 1.

Fork 2 flanks, with its fork legs 4 arranged preferably congruently opposite one another, a running wheel 6 mounted in a fork cavity 5. A hollow axle 7, which penetrates running wheel 6 centrally and is mounted on the respective end sides on fork legs 4, functions for mounting running wheel 6. The wheel axle c runs transversely to pivot axis a.

Caster 1 as depicted may be positioned, e.g., on a hospital bed or the like. The fixing is then carried out in the usual way and is therefore not described here in any detail.

A trip cam 8 is provided in assembly journal 3 and arranged to move pivotably about an actuating axis b. Actuating axis b hereby extends in the exemplary embodiment shown perpendicularly and correspondingly transversely to pivot axis a of caster 1, thus corresponding to a horizontal plane during usual handling and use of caster 1.

The fixing of trip cam 8 within assembly journal 3 is carried out in a known way via a fixing sleeve 9 aligned about pivot axis a.

For rotary entrainment of trip cam 8, this has a centrally arranged, non-circular coupling opening 10, which is penetrated by a shaft of a switch lever 11. Its cross section is adapted to form an interlocking lock with the cross section of coupling opening 10 (here preferably a hexagonal cross section).

With reference to the depictions, two tappets 12 and 13 are provided below trip cam 8. These are aligned in the vertical direction in assembly journal 3 to be displaceable in the direction of pivot axis a. Assembly journal 3 has a tappet passage 14 with a reduced diameter aligned about pivot axis a, wherein the cross section of tappet passage 14 is adapted to the combined cross section of tappets 12 and 13. The base contour of the combined cross section of tappets 12 and 13 or of tappet passage 13 is approximately rectangular. By this means, tappets 12 and 13 are secured against turning within assembly journal 3.

Tappets 12 and 13 are arranged next to one another transverse to the vertical direction in the normal operating position of caster 1, corresponding to the preferred vertical alignment of assembly journal 3. With the surfaces facing one another, tappets 12 and 13 contact one another preferably at least approximately with their full surfaces, i.e. with more than 50% of the surface. The contacting surfaces of tappets 12 and 13 form in a line transverse to the vertical direction or transverse to pivot axis a in one cross section (see FIG. 7a).

As is clear, e.g., in the depictions of FIGS. 5 to 8, the free end of each tappet 12, 13, arranged respectively between the opening of tappet passage 14 and trip cam 8, is provided with a roller bearing 15.

Figure 7A:
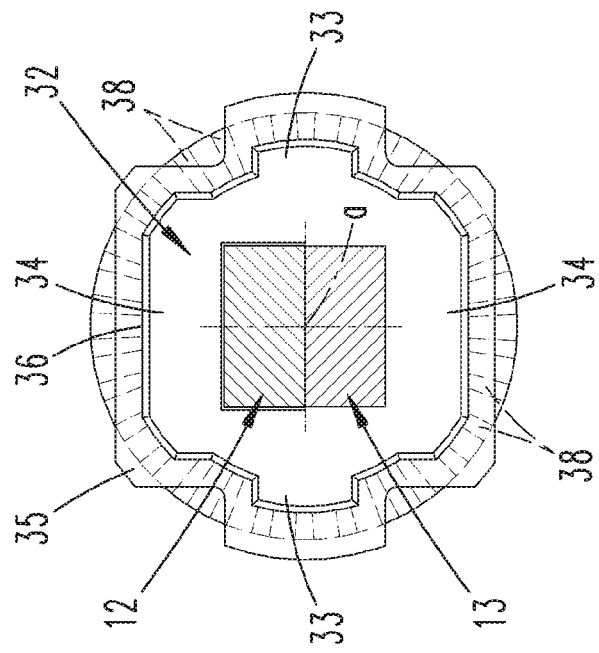
FIG. 7a the section according to plane VIIa in FIG. 5.

Roller bearings 15 are mounted on assigned tappet 12 or 13 in the region of a tappet section protruding freely in the vertical direction, said tappet section is formed on the broad side surface of the tappet facing away from the apposition of both tappets 12 and 13 with reference to a cross section according to FIG. 7a.

A journal 16 is provided, rotationally fixed to the inner ring of roller bearing 15, which is mounted in the previously described freely projecting section of the tappet. The geometric axis of rotation of roller bearing 14 resulting herefrom extends transversely to pivot axis a, more preferably aligned parallel to actuating axis b.

Trip cam 8 acts on tappet 12 or 13 via the outer ring of roller bearing 15.

In the region above tappet passage 14, tappets 12 and 13 are encompassed by reset springs 17 and 18. These are designed in the exemplary embodiment depicted as cylindrical compression springs.

A tappet 12 or 13 is assigned to each reset spring 17 or 18, Both reset springs 17 and 18 extend in a concentric alignment to pivot axis a, wherein reset spring 17 has a smaller diameter with respect to reset spring 18 and preferably extends at least partially within reset spring 18.

Both reset springs 17 and 18 are supported in the region of their vertical bottom end on a surface surrounding tappet passage 14 (reset spring 17) and on a radially expanded step face of fixing sleeve 9 offset to this in the vertical direction (reset spring 18).

Reset spring 17 may act with its vertical upper end against an annular shoulder 19 formed on tappet 12. For elastic impingement of tappet 18 in a direction vertically upward, a collar 20, which extends radially outward and against which reset spring 18 is supported on the underside, may be formed on tappet 18.

Reset springs 17 and 18 are preferably (also) pretensioned in an initial position (free running position). Tappets 12 and 13 corresponding tend to be constantly loaded vertically upward. Roller bearings 15 or their outer rings correspondingly contact the peripheral surface of trip cam 8.

Both tappets 12 and 13 are displaceable independently from one another in the extension direction of pivot axis a or in the vertical direction. The corresponding displacement is carried out as a result of a controlling impingement of tappet 12 or 13 via the peripheral surface of trip cam 8 using roller bearing 15.

The peripheral surface of the trip cam may have cam surfaces 21 and 22, designed differently from one another and lying adjacent to one another when viewed in the direction of actuating axis b. It is hereby provided that cam surface 21 is assigned to tappet 12 and cam surface 22 is assigned to tappet 13.

An embodiment is shown in which trip cam 8 is designed as two parts, with a first partial cam 23 and a second partial cam 24. Both partial cams 23 and 24, designed substantially as disks, lie adjacent to one another in the extension direction of actuating axis b, wherein partial cam 23 peripherally has cam surface 21 and partial cam 24 peripherally has cam surface 22.

Second partial cam 24 is mounted in a stop-limited way to be rotatable on first partial cam 23 across a predefined angle of rotation. For this purpose, first partial cam 23 penetrates second partial cam 24 in the direction of actuating axis b with a central mandrel 25 which simultaneously has coupling opening 10 (see in particular FIG. 8).

This mandrel 25 is configured as substantially circular in outline—with respect to its peripheral surface. A stop rib 26 projects radially outward from this circular peripheral surface.

The opening of second partial cam 24 penetrated by mandrel 25 is formed as a circularly matching diameter. A radially expanded cutout 27 is provided across an angle a of approximately 60° with respect to the central opening, into which cutout stop rip 26 of first partial cam 23 immerses. As a result of the peripheral extension of stop rib 26, a free run of first partial cam 23 results across an angle of approximately 30° with respect to second partial cam 24 when viewed in the circumferential direction.

As a result of the previously described embodiment, switch lever 11, connected in an interlocking way to trip cam 8, in the case of a two-part design with first partial cam 23, acts, during a rotational activation of said switch lever about actuating axis b, directly on first partial cam 23 and only indirectly on second partial cam 24 via first partial cam 23.

Cam surface 21 of first partial cam 23 initially has in the outline, in which outline actuating axis b appears as a point, a radial recess 28 whose contour is essentially adapted to the peripheral surface facing the outer ring of roller bearing 15 for tappet 12.

When viewed from one end, radial recess 28 transitions in the circumferential direction into the annular peripheral surface, without contour influences, of partial cam 23. At the other end, radial recess 28 transitions into a cam part surface which extends across approximately 45° in the circumferential direction to a radial dimension, which approximately corresponds to a median value between the smallest radial dimension of radial recess 28 and the radial dimension of the circular peripheral surface, without contour influences, of partial cam 23. The previously designated radial dimensions are each with respect to actuating axis b.

Second partial cam 24 also has a radial recess 30 adapted to roller bearing 15 of tappet 13. One end of this also transitions directly into the circular peripheral surface of second partial cam 24 and the other end transitions in the opposite circumferential direction into a radial step-like surface section 31 which extends across an angle of approximately 15°. This surface section 31 has a radial extension dimension—with respect to actuating axis b—which corresponds to approximately 9/10 of the peripheral dimension of second partial cam 24 in the region of the circular portion of the peripheral surface. Furthermore, surface section 31 is convex when viewed from tappet 13.

With respect to a projection of first partial cam 23 on second partial cam 24 (for example FIG. 5), there results—starting from the respective radial recess 28 or 30—a connection of the respective surface section 29 or 31 in the same circumferential direction.

Tappets 12 and 13 extend, when viewed while passing through tappet passage 14 in the direction of running wheel 6, farther into fork cavity 5. Tappet 12 supports here a stop plate 32 in the area of its end engaging in fork cavity 5. Said stop plate extends in a plane oriented transversely to pivot axis a.

Stop plate 32 has, with respect to an outline of stop plate 32, projections 33 and 34 arranged crosswise to one another, wherein opposite projections 33 have a width, which corresponds approximately to the corresponding half width dimension of projections 34 arranged offset by 90° in the outline to projections 33, when viewed transverse to a radial line.

Stop plate 32 functions for interacting with a locking part 35 which is fixed in fork 2. Locking part 35 has an interlocking recess 36 which is adapted in outline to the surrounding outer contour of locking part 35.

Figure 5:
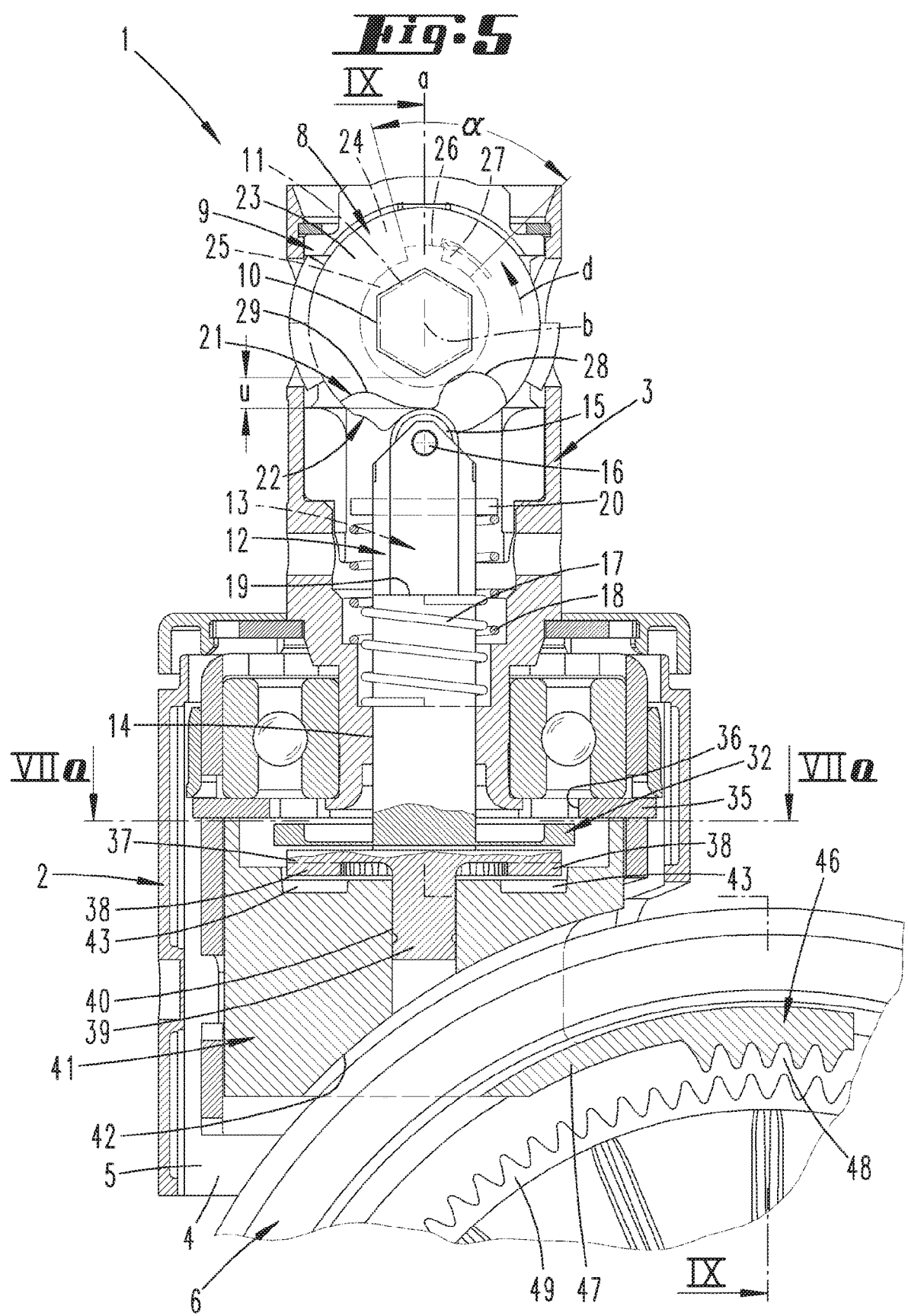
FIG. 5 the section according to line V-V in FIG. 1, relating to a free-running position of the caster.
Figure 6:
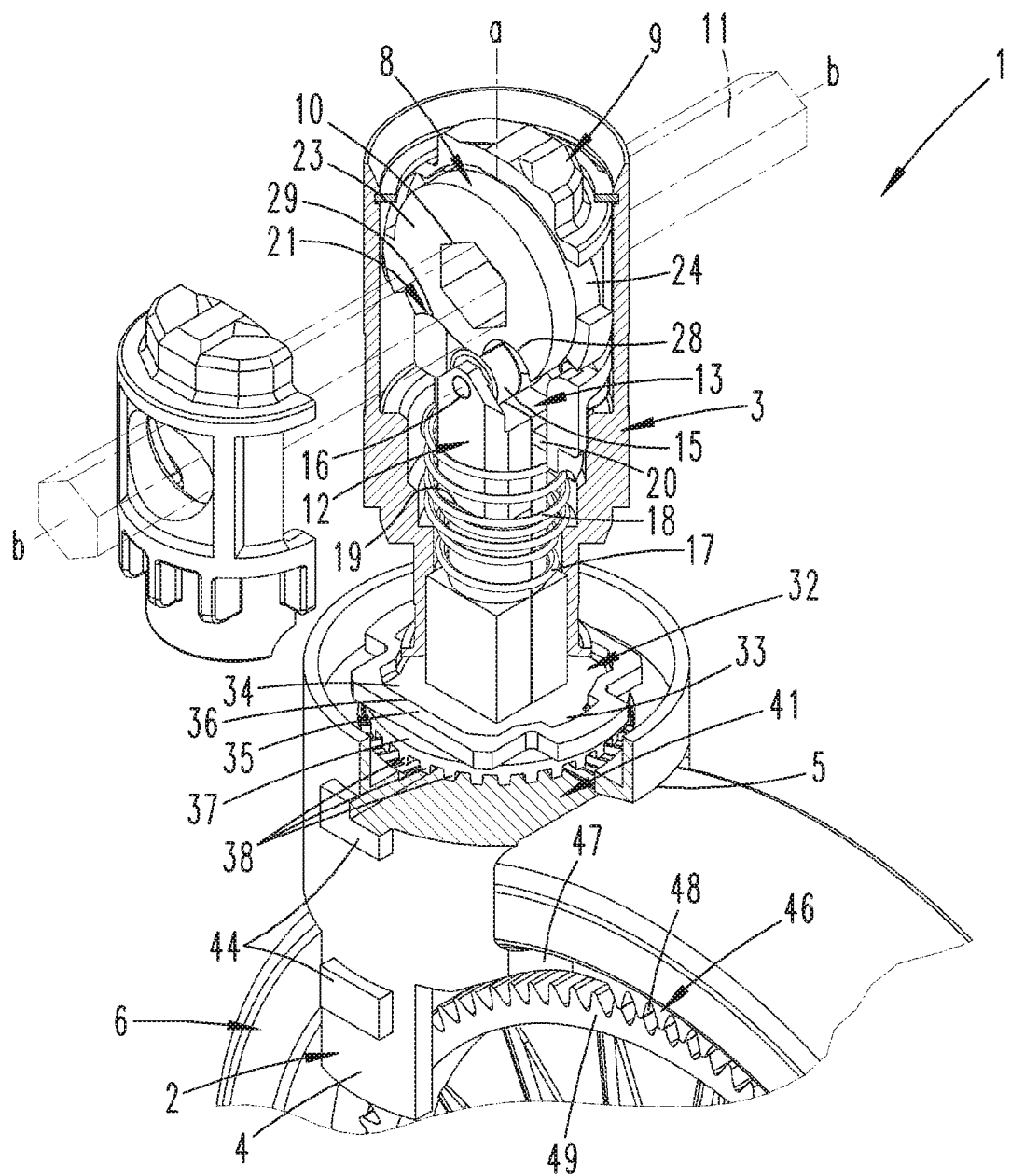
FIG. 6 a partially broken open detailed perspective, relating to the free-running position according to FIG. 5.

In an initial position (free running position), stop plate 32 extends below interlocking recess 36 of locking part 35 (see FIG. 5).

Stop plate 32 is penetrated by the additional tappet 13, which supports an integral locking plate 37 in the region of its free end underneath stop plate 32. Locking plate 37 is provided on its lower side, correspondingly facing away from trip cam 8, with a toothing 38, formed by ridges aligned essentially radially (with respect to pivot axis a).

A journal 39, facing in the direction of running wheel and projecting centrally on the toothed side in the direction of pivot axis a, immerses into a correspondingly adapted hole 40 of a first braking part 41. This first braking part 41 is essentially guided in fork 2 and may be displaced along pivot axis a relative to fork 2. The friction surface 42 facing running wheel 6 extends in a curved way in a vertical section according to FIG. 5, preferably with a radius of curvature adapted to the radius of the peripheral running wheel surface.

First braking part 41 forms a cavity surrounding tappet 13 and facing the fork-side of locking part 35. Locking plate 37 extends into said cavity.

A counter toothing 43, adapted to toothing 38, is formed on the base side of the cavity facing locking plate 37.

First braking part 41 is also mounted rotationally fixed on fork 2, like locking part 35.

Figure 7:
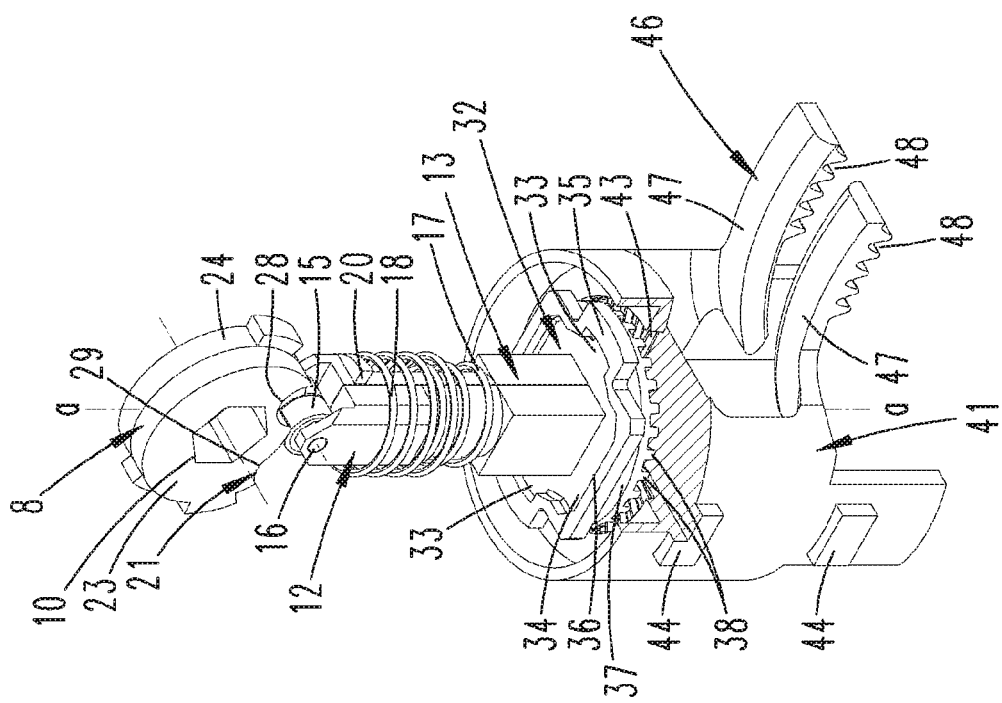
FIG. 7 the position of a trip cam arrangement and a tappet arrangement comprising braking and direction locking parts, relating to the free-running position.
Figure 8:
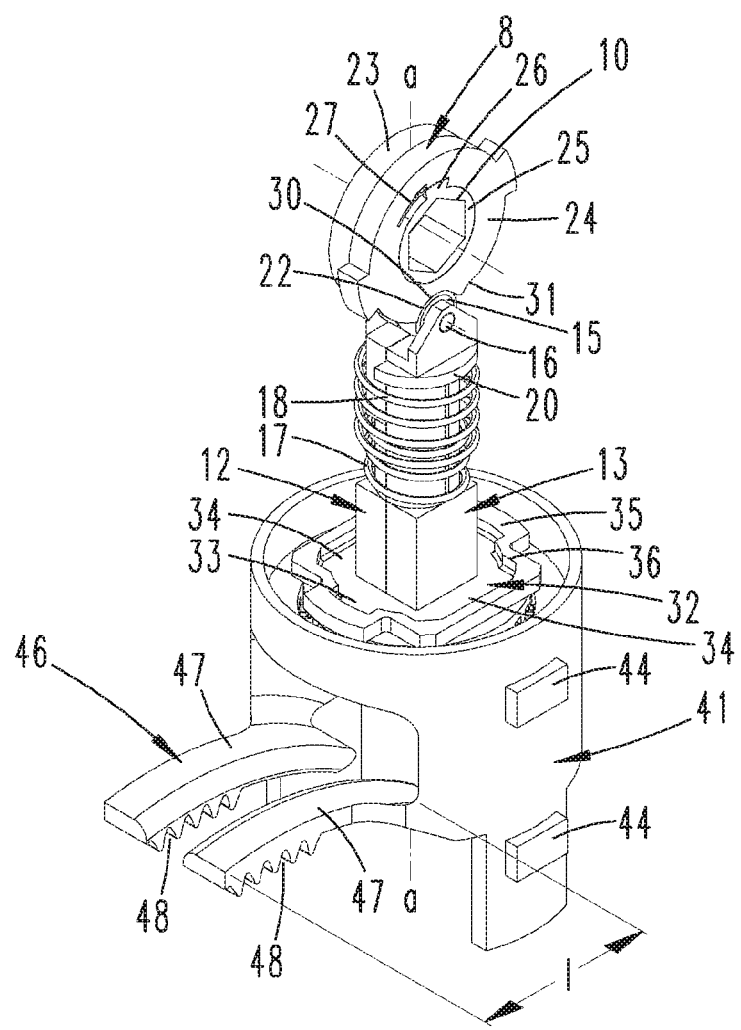
FIG. 8 the back view of FIG. 7 in a perspective detail view.
Figure 9:
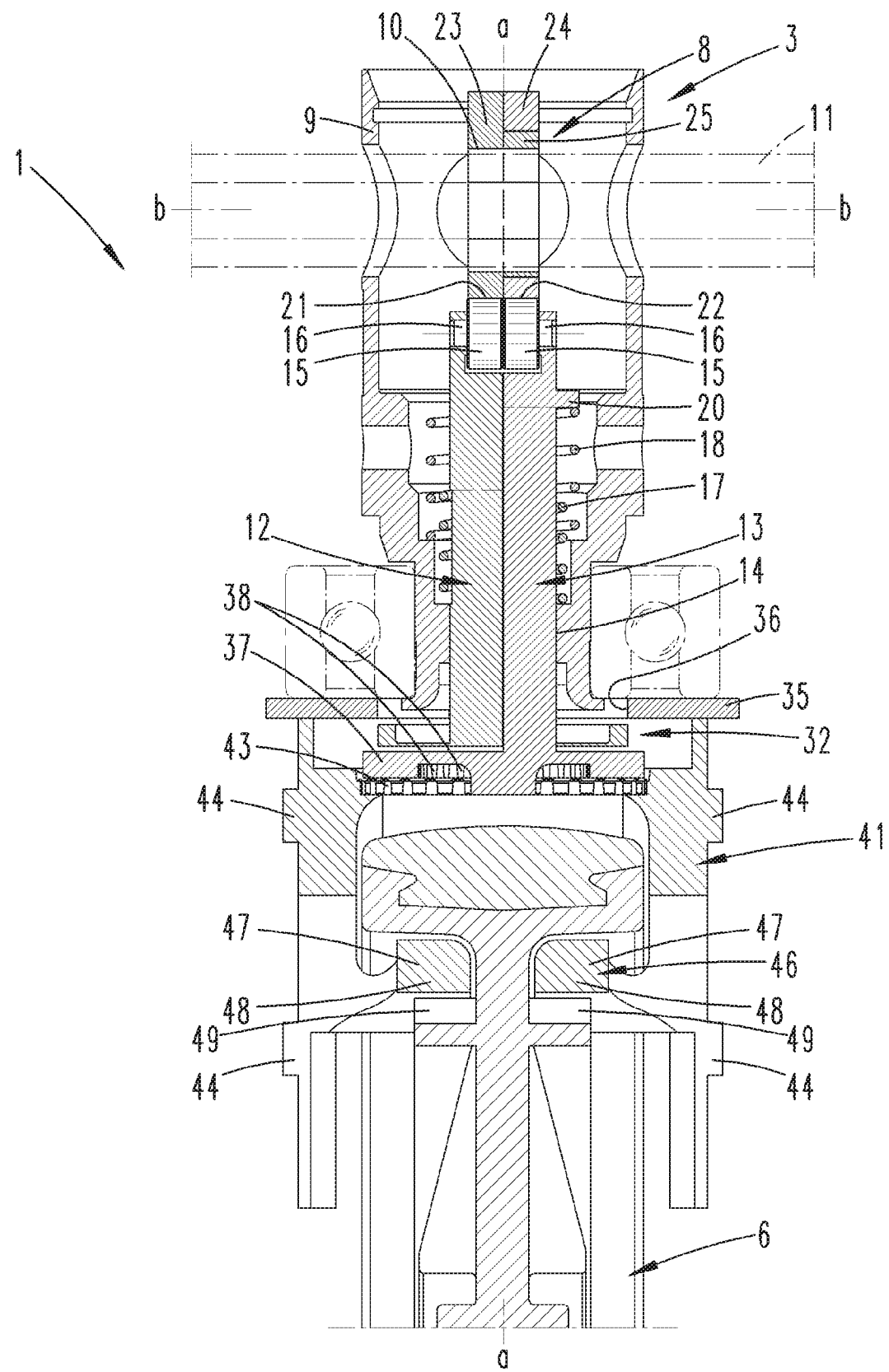
FIG. 9 the section according line IX-IX in FIG. 5.

As is particularly clear from the depictions in FIGS. 7 and 8, guide projections 44 are provided on the wall outer sides of first braking part 41, which immerse in slot-like windows 45 in the region of fork leg 4 for rotationally fixed, yet slidable displaceability of first braking part 41 in fork 2.

Furthermore, first braking part 41 may be loaded vertically upward in its initial position, as is also preferred, by a spring, e.g. a hairpin spring, not shown, in which initial position first braking part 41 may be supported on locking part 35 on the fork side.

As is additionally clear from the depictions in FIGS. 7 and 8, another second braking part 46 is integral to first braking part 41. In the exemplary embodiment shown, second braking part 46 consists of two arms 47, integral to first braking part 41, which project freely starting from first braking part 41. Alternatively only one arm 47 may be provided.

Arms 47 extend on a radius line relative to wheel axis c with respect to a side view in which pivot axis a defines a line.

On the under side, i.e. radially inwardly with respect to the running wheel axis of arms 47, interlocking means 48 are provided in the form of a toothing. These serve for interlocking interaction with a sprocket 49 in each case. Both sprockets 49 are formed on both sides of the wheel rim on running wheel 6.

The freely projecting length l of arms 47 from their connection on first braking part 41 up to the end facing away from the connecting region corresponds in the embodiment shown to approximately one-tenth of the length of a peripheral line connecting the crests of the teeth of sprocket 49.

The arrangement is more preferably selected such that interlocking means 48 of arms 47 are provided assigned to a zenith of sprocket 49 in the operating position of running wheel 1.

Figure 10:
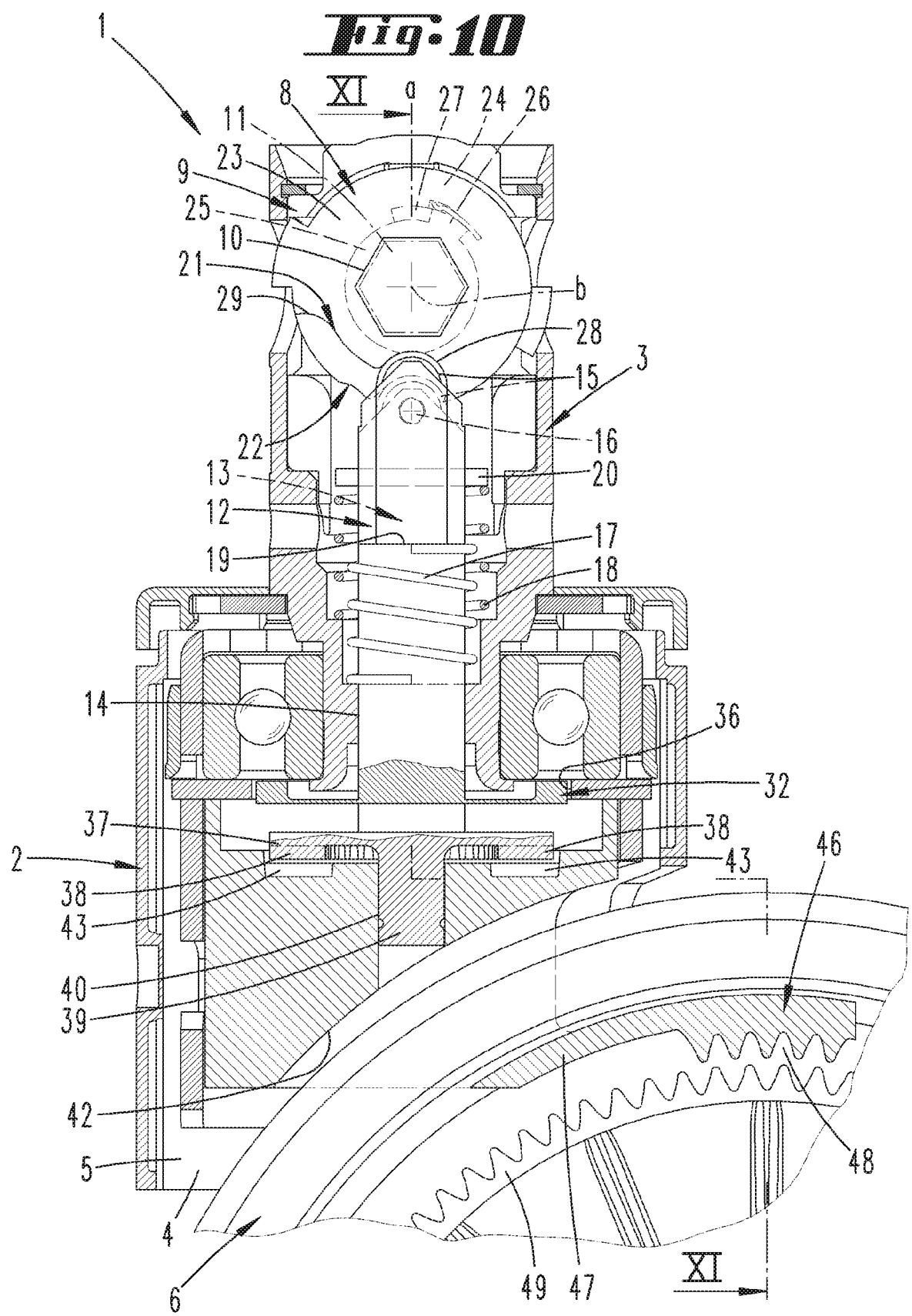
FIG. 10 a view corresponding to FIG. 5; however relating to a direction lock without braking action (fixed caster position)
Figure 11:
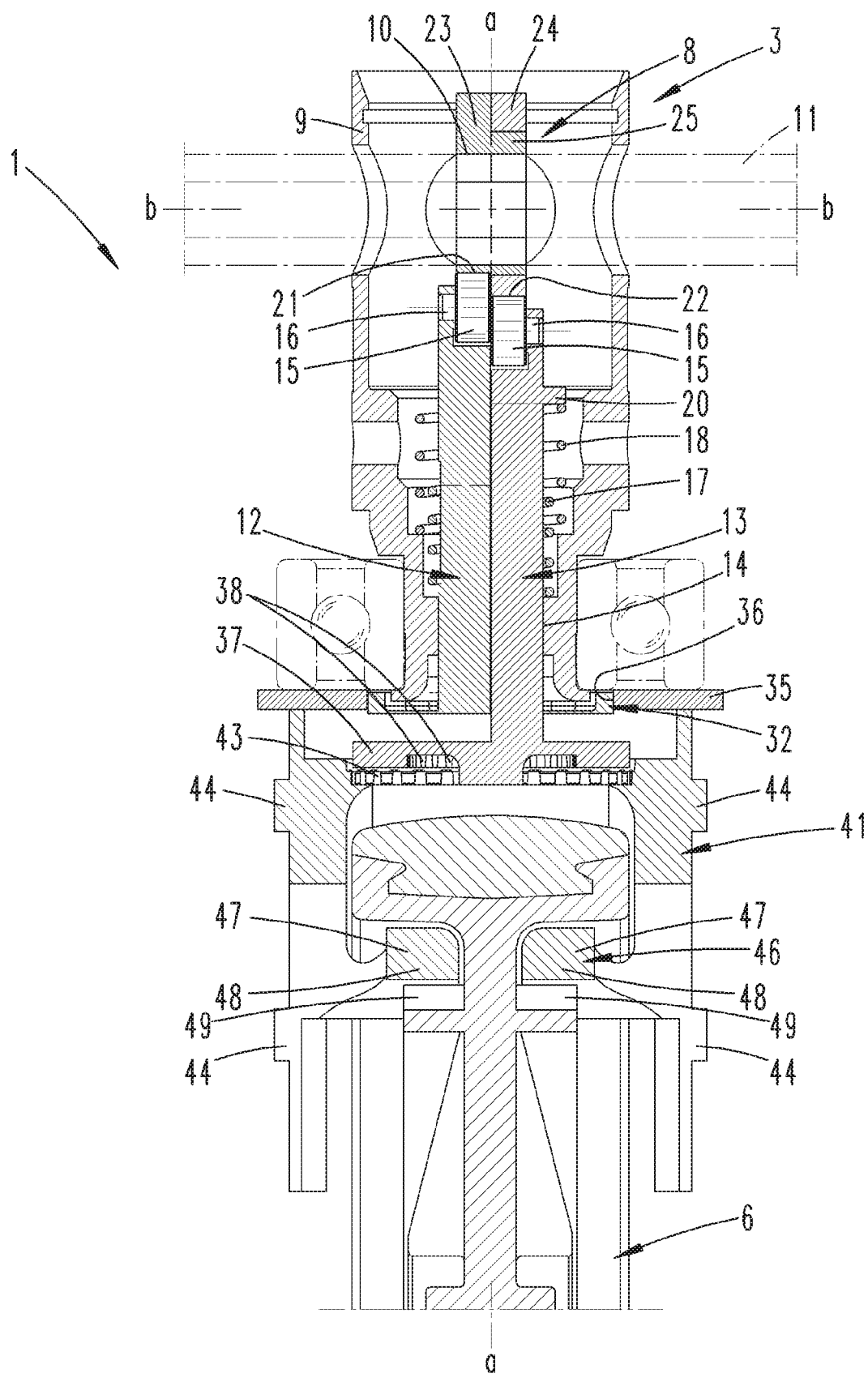
FIG. 11 the section according to line XI-XI in FIG. 10.

FIGS. 10 and 11 show caster 1 in a so-called fixed caster position, in which only the steering function is overridden.

Trip cam 8 and thus partial cams 23 and 24 are hereby located in a rotated position, in which tappets 12 and 13 with their roller bearings 15 are held spring supported into respective radial recesses 28 and 30. In this position, both tappets 12 and 13 are in their vertically highest position.

Locking plate 37 of tappet 13 in this fixed cam position is vertically spaced apart from counter toothing 43 of first braking part 41. Correspondingly, no engagement results in this case. In addition, first braking part 41 is held in the stop-limited initial position, in which no braking effect is achieved.

If, e.g., caster 1 is fixed on a hospital bed, the fixed caster position of caster 1 is considered for a facilitated straight line directed pushing operation of the bed or as the initial position. In this fixed caster position, projections 33 and 34 of tappet are inserted in interlocking recess 36 of locking part 35 in a rotational locking way under the spring pretensioning of reset spring 17.

The fixed caster position may also then be set by the user as a result of corresponding rotation of trip cam 8 via switch lever 11, if running wheel 6 is not aligned in a direction permitting the engagement between stop plate 32 and locking part 35. Tappet 12, responsible for establishing the steering function, then engages on the underside on locking part 35 via stop plate 32 by means of the spring pretensioning of reset spring 17 or slides along the same during steering activation of caster 1 due to the spring pretensioning until projections 33 and 34 are aligned congruent to one another with interlocking recess 36 and interact in a latching manner due to the spring pretensioning. This facilitates in this exemplary embodiment an approximately 180° rotation of running wheel 6 about pivot axis a until it reaches the fixed caster position.

From this fixed caster position, due to rotary displacement of trip cam 8, thus in particularly initially only of partial cam 23 relative to partial cam 24, the free running position according to FIGS. 5 to 9 may be achieved (direction of rotation d). Partial cam 24 correspondingly remains in its fixed caster position. In this context, tappet 13 is not displaced.

Instead, only tappet 12 is displaced from the fixed caster position into the free running position, as is also the case in a displacement from the free running position back into the fixed caster position.

Due to the rotational displacement of partial cam 23, roller bearing 15 of assigned tappet 12 is displaced by force from radial recess 26 into a support position, in which roller bearing 15 of tappet 12 is supported on surface section 29. Tappet 12 and thus stop plate 32 fixed thereon are displaced vertically downward by the radial difference dimension u in the region of cam surface 21 such that stop plate 32 is brought out of engagement with locking part 35.

In this free running position, running wheel 6 is pivotable about pivot axis a and also rotatable about wheel axis c.

Figure 12:
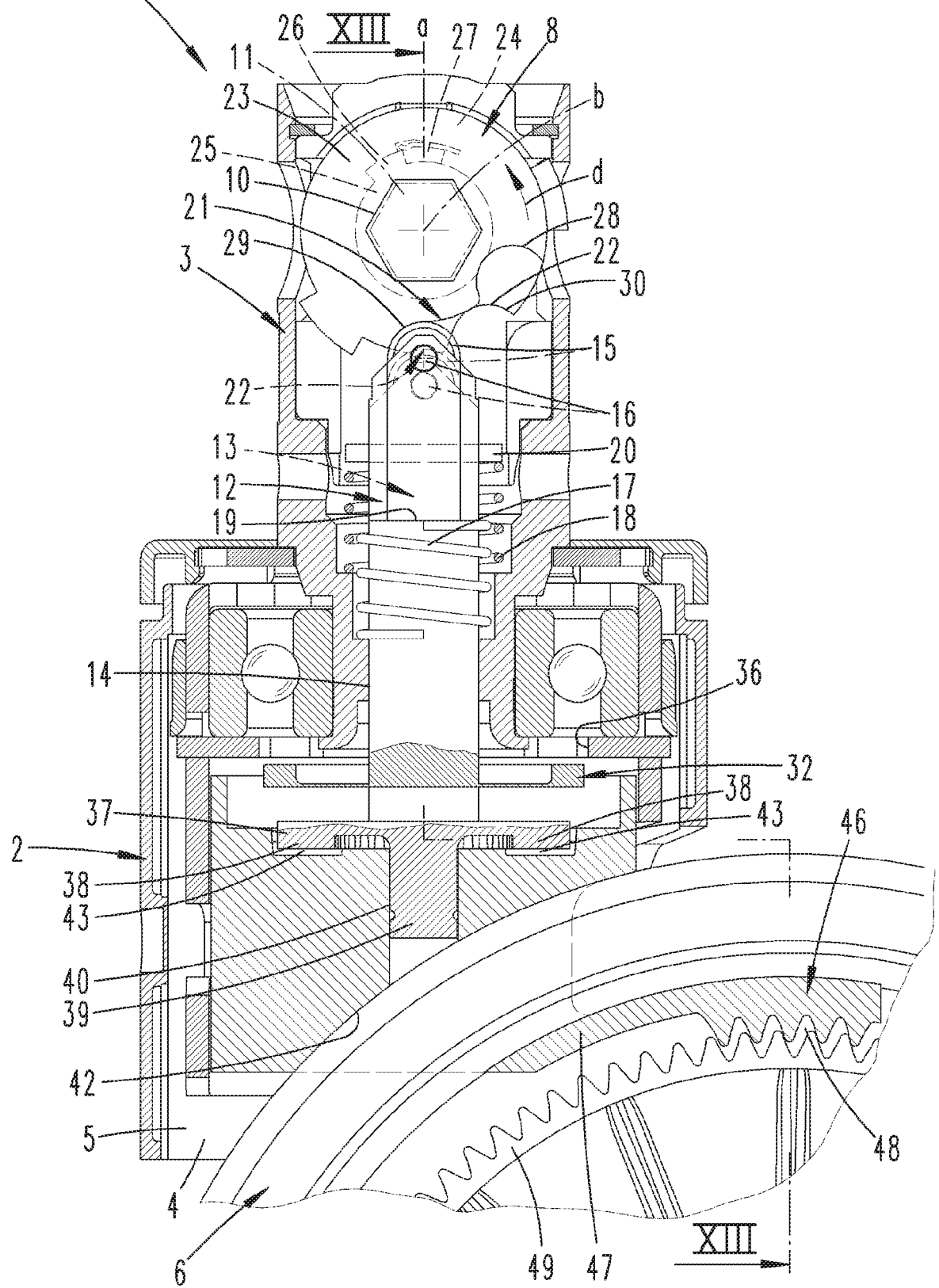
FIG. 12 another view corresponding to FIG. 5, relating to a total lock of the caster.

To achieve a total locking of caster 1 or running wheel 6, as this is depicted in FIGS. 12 and 13, trip cam 8 or partial cam 23 connected interlockingly with switch lever 11 is rotated further in direction of rotation d. This leads, due to an interaction of stop rib 26 and cutout 27 to a rotary towing entrainment of second partial cam 24 into an ultimately preferred stop-limited end position.

Over the course of this additional rotational displacement of trip cam 8, roller bearing 15 or its outer ring of tappet 12 runs along surface section 29 of partial cam 23, said surface section 29 preferably follows a circular section relating to actuating axis b. Tappet 12 is subject to no additional vertical displacement over the course of this additional pivot displacement of trip cam 8.

Instead, during a displacement from the free running position into the total locking position—and also conversely from the total locking position into the free running position—only tappet 13 is linearly displaced. This leaves assigned radial recess 30 of partial cam 24 and, following a corresponding linear modulation, is supported on convex surface section 31. Due to the vertical displacement, there initially occurs an interlocking engagement of locking-plate-side toothing 38 and counter toothing 43 of first braking part 41 and a subsequent towing displacement of first braking part 41 vertically downward into a position in which friction surface 42 contacts the running surface of running wheel 6 in a friction locking action.

Simultaneously, second braking part 36 is also displaced downward the same linear dimension as first braking part 41, such that interlocking means 48 of the braking-part-side arms 47 may engage in interlocking engagement with running-wheel-side sprocket 49.

Due to the freely projecting embodiment of arms 47, an elastic connection of second braking part 46 to first braking part 41 is established. Arms 47 may elastically yield in the case of jamming. Such jamming may be achieved in the case that the tooth crests of interlocking means 48 strike tooth crests of sprocket 49 in an unfortunate wheel position. In such a situation, the achievement of the total locking position, in which a braking effect is also achieved, is also possible, even if optionally initially only a friction-locking braking action may be achieved. A slight movement of running wheel 6 in the running direction is sufficient, however, to facilitate an automatic drop of interlocking means 48 into sprocket 49; this is a consequence of the elastic reset ability of arms 47.

While the pivot locking position is possible in the fixed caster position in the exemplary embodiment shown only in two running directions, offset by 180°, of running wheel 6, a locking of running wheel 6 about pivot axis a in the total locking position is achievable in practically any pivot direction of running wheel 6.

For the two possible locking positions (fixed caster position, total locking position), two tappets 12, 13 are provided, displaceable independently of each other, which each support only the functional parts which are necessary for the respective function. This leads to a significant reduction of the switching forces, as lower forces have to be applied, in comparison to the known prior art, by the preferred combination of frictional braking device and interlocking braking device to achieve the braking effect.

The above mentioned embodiments function to explain the inventions completely covered by the application, which refine the prior art at least due to the following combination of features, and also independently, namely:

A caster, which is characterized in that two tappets 12, 13 are provided which are movable independently of each other, wherein only the direction locking without braking action is settable via one of tappets 12.

A caster, which is characterized in that the braking device has a second braking part 46 for the interlocking lock of running wheel 6.

A caster, which is characterized in that tappets 12, are arranged next to one another transverse to a vertical direction in the normal operating position of caster 1 and extend next to one another in the vertical direction.

A caster, which is characterized in that trip cam 8 has two cam surfaces 21, 22 which are each assigned to one of tappets 12, 13, and wherein cam surfaces 21, 22 are designed differently from one another.

A caster, which is characterized in that trip cam 8 acts on one or both tappets 12, 13 by means of a roller bearing 15.

A caster, which is characterized in that one or both roller bearings 15 are mounted on one or respectively on one of tappets 12, 13.

A caster, which is characterized in that trip cam 8 is designed in two parts, with one first and one second partial cam 23, 24.

A caster, which is characterized in that first partial cam 23 penetrates second partial cam 24 in a direction transverse to the vertical direction.

A caster, which is characterized in that trip cam 8 is penetrated by a switching lever 11, which, in the case of partial cams 23, 24, only acts directly on one of partial cams 23.

A caster, which is characterized in that first partial cam 23 is rotatable relative to second partial cam 24 about an axis of rotation b, about which trip cam 8 is to be rotated during actuation.

A caster, which is characterized in that one of tappets 13 interacts with a braking part, wherein the braking part preferably comprises a first friction-locking braking part 41 and a second interlocking lock braking part 46.

A caster, which is characterized in that first and second braking parts 41, 46 are designed fixedly connected to one another.

A caster, which is characterized in that running wheel 6 has a sprocket 49, preferably for interaction with second interlocking lock braking part 46.

A caster, which is characterized in that interlocking means 48 of second braking part 46 are indeed fixed on a part preferably rigidly connected to first braking part 41 yet also elastically movable with respect thereto.

A caster, which is characterized in that second braking part 46 is designed on an arm projecting from first braking part 41 in the circumferential direction of running wheel 6.

All disclosed features are essential to the invention (in themselves and also in combination with one another). The disclosed contents of associated/appended priority documents (duplicate of the pre-application) are completely included in the disclosure of the application, also for the purpose of also including features of these documents in the claims of the present application. The subclaims characterize with the features independent refinements according to the invention of the prior art, in particular in order to carry out partial applications on the basis of these claims.

| List of Reference Numerals | |
|---|---|
| 1 | Caster |
| 2 | Fork |
| 3 | Assembly journal |
| 4 | Fork leg |
| 5 | Fork cavity |
| 6 | Running wheel |
| 7 | Hollow axle |
| 8 | Trip cam |
| 9 | Fixing sleeve |
| 10 | Coupling opening |
| 11 | Switch lever |
| 12 | Tappet |
| 13 | Tappet |
| 14 | Tappet passage |
| 15 | Roller bearing |
| 16 | Journal |
| 17 | Reset spring |
| 18 | Reset spring |
| 19 | Annular shoulder |
| 20 | Collar |
| 21 | Cam surface |
| 22 | Cam surface |
| 23 | Partial cam |
| 24 | Partial cam |
| 25 | Mandrel |
| 26 | Stop rib |
| 27 | Cutout |
| 28 | Radial recess |
| 29 | Surface section |
| 30 | Radial recess |
| 31 | Surface section |
| 32 | Stop plate |
| 33 | Projection |
| 34 | Projection |
| 35 | Locking part |
| 36 | Interlocking recess |
| 37 | Locking plate |
| 38 | Toothing |
| 39 | Journal |
| 40 | Hole |
| 41 | First braking part |
| 42 | Friction surface |
| 43 | Counter toothing |
| 44 | Guide projection |
| 45 | Window |
| 46 | Second braking part |
| 47 | Arm |
| 48 | Interlocking means |
| 49 | Sprocket |
| a | Pivot axis |
| b | Actuating axis |
| c | Wheel axis |
| d | Axis of rotation |
| l | Length |
| u | Dimension |
| α | Angle |

The invention claimed is:

1. A caster (1) comprising a running wheel (6), a fork (2) and an assembly journal (3), wherein the fork (2) is pivotable relative to the assembly journal (3) and a braking device is arranged in the fork (2) which is configured to be displaced into a braking position via a tappet (13) actuated by a trip cam (8), wherein a direction lock is configured to be set without a braking action on the running wheel (6), and two tappets (12, 13) are provided which are movable independently of each other, wherein only the direction lock without braking action is configured to be set via one of the tappets (12), wherein in a normal operating position of caster (1), the tappets (12, 13) are arranged next to one another transverse to a vertical direction and extend next to one another in the vertical direction, the trip cam (8) has two cam surfaces (21, 22) which are each assigned to one of the tappets (12, 13) and the cam surfaces (21, 22) are shaped differently from one another.

2. The caster according to claim 1, wherein the trip cam (8) is comprised of two parts, with one first and one second partial cam (23, 24).

3. The caster according to claim 1, wherein the trip cam (8) acts on both tappets (12, 13) by means of a pair of corresponding roller bearings (15).

4. The caster according to claim 3, wherein the pair of corresponding roller bearings (15) are mounted on a respective one of the tappets (12, 13).

5. The caster according to claim 2, wherein the first partial cam (23) penetrates the second partial cam (24) in a direction transverse to the vertical direction.

6. The caster according to claim 2, wherein the trip cam (8) is penetrated by a switching lever (11), which acts directly on one of the partial cams (23).

7. The caster according to claim 2, wherein the first partial cam (23) is rotatable relative to the second partial cam (24) about an axis of rotation (b), about which the trip cam (8) is to be rotated during actuation.

8. The caster according to claim 1, wherein one of the tappets (13) interacts with a braking part, wherein the braking part comprises a first friction-locking braking part (41) and a second interlocking lock braking part (46).

9. The caster according to claim 8, wherein the running wheel (6) has a sprocket (49), for interaction with the second interlocking lock braking part (46).

10. The caster according to claim 8, wherein interlocking devices (48) of the second braking part (46) are fixed on a part rigidly connected to the first braking part (41) and elastically movable with respect thereto.

11. The caster according to claim 8, wherein the second interlocking lock braking part (46) is connected to an arm (47) projecting from the first braking part (41) in a circumferential direction of the running wheel (6).

12. A caster (1) comprising a running wheel (6), a fork (2) and an assembly journal (3), wherein a braking device is provided in the fork (2) which is configured to be displaced into a braking position preferably via a trip cam (8), wherein the braking device has a first braking part (41) for friction-locking action on the running wheel (6), wherein the braking device has a second braking part (46) for an interlocking lock of the running wheel (6) for a combined interlocking and frictional lock position of the running wheel;

wherein a direction lock is configured to be set without a braking action on the running wheel (6), and two tappets (12, 13) are provided which are movable independently of each other, wherein only the direction lock without braking action is configured to be set via one of the tappets (12).

13. The caster according to claim 12, wherein the trip cam (8) has two cam surfaces (21, 22) which are each assigned to one of the tappets (12, 13), and the cam surfaces (21, 22) are shaped differently from one another.

14. The caster according to claim 12, wherein the first friction-locking and the second interlocking lock braking parts (41, 46) are fixedly connected to one another.

\* \* \* \* \*